Sept. 29, 1953
J. M. WALLACE ET AL
2,654,053
AUTOMATIC SWITCH
Filed Nov. 19, 1948
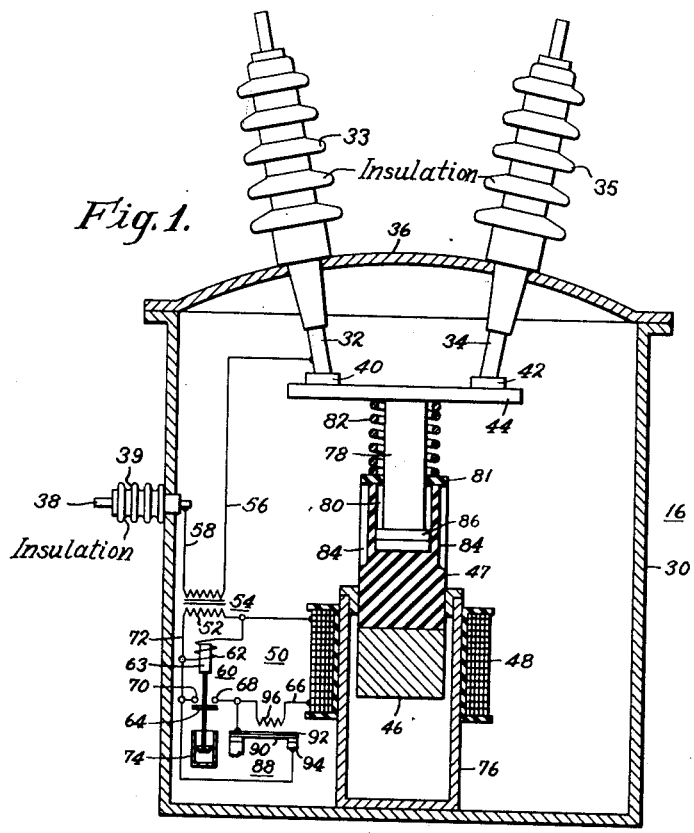
WITNESSES:
Edward Michaels
Arthur T. Stratton
INVENTORS
James M. Wallace &
Andrew W. Edwards.
BY Ralph H. Swingle
ATTORNEY Patented Sept. 29, 1953

2,654,053

UNITED STATES PATENT OFFICE 2,654,053

AUTOMATIC SWITCH

James M. Wallace and Andrew W. Edwards, East McKeesport, Pa., assignors to Westinghouse Electric Corporation, East Pittsburgh, Pa., a corporation of Pennsylvania Application November 19, 1948, Serial No. 60,862

17 Claims. (Cl. 317—23)

This invention relates to systems for the distribution of electrical power as well as switching mechanism therefor, and more particularly to a novel arrangement for automatically energizing the system by sections.

In electrical distribution systems wherein the load density is relatively high and comprises for example, a larger number of load devices which require high inrush currents for starting, considerable difficulty has been heretofore experienced in reenergizing the system following a main or bus fault or similar outage which persists for a relatively long period of time. This condition results from the fact that during deenergization of the system, due to the outage, the motor driven automatic devices such as refrigerating systems, air compressors, pumps and the like, will be conditioned for operation, and thus the diversity factor of the system will be eliminated. It will be readily understood that under such conditions, the current required after the outage will be several times normal load values and this may persist for a substantial period of time. As a result, the protective devices associated with the system will operate and render it impossible to pick up the load.

It is accordingly, one of the objects of the present invention to provide an electrical distribution system and switch mechanism therefor which is so arranged and constituted as to avoid the objections and disadvantages outlined above.

Another object is to provide a system of the foregoing character which is constructed in such a manner that reenergization thereof, after an outage, will occur by sections, each section being automatically energized a predetermined time interval after the preceding section.

Still another object is to provide in an electrical distribution system, a novel arrangement of automatically operable sectionalizing switches having time delay characteristics, the construction being such that upon reestablishment of service following an outage, the various load sections will be reenergized at successive time intervals beginning at one end of the system and continuing throughout the length thereof.

Another object resides in the provision of a novel sectionalizing switch construction for a system of the above type, so arranged as to prevent opening thereof during a temporary fault but insuring opening operation with a time delay interval should the fault persist.

A further object is to provide in a switch construction of the above character, a novel arrangement including time delay means for opening the switch upon the persistence of a fault, and including also, time delay means for closing the switch in response to reenergization of the preceding load section.

A still further object is to provide a novel sectionalizing switch construction which is highly efficient in operation, includes relatively few parts, and is economical to manufacture.

The above and other objects and novel features of the invention will appear more fully hereinafter from a consideration of the following detailed description when taken in connection with the accompanying drawing which is illustrative of one form of the invention. It is to be expressly understood however, that the drawing is utilized for purposes of illustration only and is not to be taken as a definition of the limits of the invention, reference being had for this purpose to the appended claims.

In the drawing, wherein similar reference characters refer to similar parts throughout the several views:

Figure 1 is a substantially central sectional view of a sectionalizing switch constructed in accordance with the principles of the present invention, and Fig. 2 is a diagrammatic view of a transmission circuit having a plurality of load sections and sectionalizing switches associated therewith.

Referring more particularly to Fig. 2, the present invention is illustrated therein as including a transmission circuit 10, provided with a suitable source of power such as transformer 12, and including a conventional circuit protective device such as an automatic reclosing circuit breaker 14 of a well known type which, upon the occurrence of an overload condition, recloses a predetermined number of times and is finally locked out in the event that the condition persists. Upon clearing of the fault, the breaker 14 is manually closed to restore service. As shown, a plurality of sectionalizing switches 16, 18 and 20, of similar construction, are connected with the circuit and serve to sectionalize the latter into load sections 22, 24, 26 and 28. With such an arrangement, it will be readily understood that energization of the load section 22 depends upon the closure of the breaker 14, while energization of the load sections 24, 26 and 28 depends upon the successive closure of the switches 16, 18 and 20.

The novel sectionalizing switch of the present invention is more particularly illustrated in Fig. 1 and includes a casing 30, preferably of metal, having line and load terminals 32 and 34 supported in bushings 33 and 35 of insulating material such as porcelain, from a cover 36, and having also a voltage terminal 38 connected to ground and supported in an insulating bushing 39 passing through the casing wall. In the position shown, the switch is in series in the circuit wherein line contact 40, secured on the inner end of load terminal 32, is connected with load contact 42, which is secured on the inner end of load terminal 34, by a contact element or bar 44. The latter is actuated in opposite directions to close and open the circuit, by a magnetizable core 46 cooperable with a solenoid winding 48, and the energization of the latter is effected by means of a control circuit 50 which includes the secondary winding 52 of a transformer 54, the latter being connected through leads 56 and 58 with terminals 32 and 38 respectively, and thus constituting a source of power for the control circuit 50. From the foregoing, it will be seen that when circuit 50 is energized, the solenoid winding 48 will likewise be energized to maintain the parts 46 and 44 in the position illustrated. On the other hand, should the circuit 50 become deenergized, the core 46 will drop and effect an opening of the separable contacts constituted by the bar 44 and contacts 40 and 42.

The control circuit 50, in addition to the foregoing elements, also includes a time delay relay 60 which functions to energize the winding 48 a predetermined interval of time after energization of the transformer 54. As shown, the relay 60 includes a movable core 63 carrying a contact element 64 which at its uppermost position completes a circuit from one side of the solenoid winding 48 to one side of the transformer secondary winding 52 by way of conductor 66, contact 68, contact element 64, contact 70 and conductor 72. The time delay action of the relay 60 in bridging contacts 68 and 70 is secured through the use of a dashpot construction 74 which is associated with the core 63, and so constructed and arranged as to close the contacts 68 and 70 a predetermined time interval after energization of the winding 62, while allowing prompt disengagement of these contacts upon deenergization of said winding. From this construction, it will be appreciated that the solenoid winding 48 will be deenergized immediately upon deenergization of the transformer 54 and the dropping out of relay 60. On the other hand, upon reenergization of the transformer 54, the energization of the solenoid winding 48 will be delayed for the time interval required for the contacts 68 and 70 to close.

One of the important features of the present invention resides in delaying the disengagement of bridging contact 44 from contacts 40, 42 when a fault occurs, for a time interval sufficient to enable the breaker 14 to undergo its complete cycle of reclosing operations. Thus, if the fault is of a temporary nature, and is cleared before complete cycling of the breaker, the contacts 40, 42 and 44 will remain closed. On the other hand, if the fault persists and the breaker 14 is eventually locked out, the contact 44 will open after a time delay interval. In order to secure the foregoing operation, the core 46 is mounted on the lower end of a piston member 47 of nonmagnetic material, preferably of an insulating material such as fiber, which in turn is mounted for reciprocal movement in the upper end of an enlarged dashpot chamber 76, for retarding the downward movement of the core when the solenoid winding 48 is deenergized. Contact bar 44 is carried by a rod 78 which has a lost motion connection with the upper portion of piston member 47 as it is slidably mounted in a bore 80 provided in the outer end of piston member 47. Rod 78 has a head 86 at its inner end which limits lost motion of the rod by engagement with the inner end of bore 80 at one extreme of relative movement, and with a cover 81 for the bore at the other extreme. Rod 78 is resiliently urged as by a coil compression spring 82, telescoped over the rod and reacting between contact bar 44 and cover 81, in a direction tending to move rod 78 and piston member 47 apart, and thus to maintain engagement between the contact bar 44 and the contacts 40 and 42 when solenoid coil 48 is energized. With such an arrangement it will be readily seen that when the solenoid winding 48 is deenergized, the core 46 will move slowly downwardly, due to the dashpot action of piston member 47 in the chamber 76, and the contact 44 will be held closed due to the expansion of the spring 82. Upon reenergization of the winding 48, the core 46 will be moved upwardly to the position illustrated. This operation would occur during the successive reclosing operations of the breaker 14, and it will be observed that the sectionalizing devices 16, 18, 20 will not then open the circuit. However, should the breaker 14 become finally locked out, thus causing deenergization of the winding 48 for a substantial time period, the core 46 will slowly drop to a position where the interior of the chamber 76 communicates with the atmosphere by way of a plurality of slots 84 formed on the piston member 47. When this occurs, the core 46 suddenly drops downwardly and the cover 81 engages head 86 of rod 78 to positively disengage the contact bar 44 from the contacts 40 and 42.

It has heretofore been pointed out that during cycling of the reclosing circuit breaker 14, the time delay relay 60 will be alternately energized and deenergized. In order to avoid disengagement of the contact bar 44 from the contacts 40 and 42, during the time interval required for closure of the contacts 68 and 70 when the relay 60 is reenergized, a novel arrangement is provided for insuring energization of the solenoid winding 48 immediately upon reenergization of the secondary winding 52 of the transformer 54. As shown, such arrangement includes a circuit 88, connected in parallel with the contacts 68 and 70, and having a thermally responsive switch 90 therein. More particularly, the switch 90 is preferably of the bimetal type including a contact carrying bimetal element 92, which when heated to a predetermined degree, flexes downwardly to engage a fixed contact 94. A heating coil 96, connected between the contact 68 and the conductor 66 of circuit 50, is arranged closely adjacent the bimetal element 92 in order to heat the latter and cause a circuit closing operation thereof in the manner indicated. It is pointed out that the switch 90 possesses sufficient thermal capacity as to remain closed throughout an open circuit condition existing during the cycling operations of the breaker 14 when a fault occurs in the transmission circuit. Thus, notwithstanding the time delay action of the relay 60, in closing its contacts, the reenergization of the transformer secondary winding 52 will immediately cause reenergization of the solenoid winding 48 by way of the series circuit including the conductor 72, stationary contact 94, bimetal contact-carrying arm 92, heating coil 96, conductor 66, winding 48 and secondary 52, and the contacts 40, 42 and 44 will hence remain in engagement during successive reclosings of the breaker 14.

In operation, it will be assumed that the transmission circuit 10 and the sectionalizing switches 16, 18 and 20 represent a portion only of a system for the distribution of electric power. With the circuit in normal operation, the breaker 14 and the sectionalizing switches are all closed and the system derives the complete advantages of the diversity factor of the load. As soon however, as an overload condition occurs in the circuit, the reclosing circuit breaker 14 will immediately start its cycle of opening and reclosing operations. Should the fault be temporary and thus cleared before the cycle is completed, the breaker will remain closed after one of its automatic circuit closing operations. During the cycling of the breaker all of the sectionalizing switches will remain closed for the reasons stated. The latter will however, with a time delay action, open in order to sectionalize and isolate the various load sections 22, 24, 26 and 28 in the event that the fault is permanent and the breaker 14 becomes finally locked out. After the fault is cleared and the breaker 14 is reclosed, the load sections 24, 26 and 28 are reconnected in the circuit at successive time intervals in order to obtain a diversity factor.

More particularly, and with the switch 16 in the position illustrated in Fig. 1, it will be understood that as the energization of the transformer 54 is periodically interrupted through the cycling of the breaker 14, the contact bar 44 will not become disengaged from the contact 40 and 42. Maintenance of the circuit from terminal 32 to terminal 34, under these conditions is assured through the time delay action secured by the dashpot comprising parts 47 and 76, and through the action of spring 82 as the core 46 descends during open circuit periods. Periodic reenergization of the winding 48 in timed relation with the reenergization of the transformer 54 is assured through the use of circuit 88 including the bimetal switch 90 and this acts to return core 46 toward the position shown in Fig. 1. In the event, however, that the breaker 14 or other circuit protective device is finally locked in open position, all of the sectionalizing switches 16, 18 and 20 will open with a time delay action, in order to sectionalize the load sections 22, 24, 26 and 28 and condition the circuit for reconnection in a novel manner as service is reestablished.

For example, and referring to Fig. 1, when the transformer 54 becomes finally deenergized, all current flow to the solenoid winding 48 will be interrupted and the core 46 will slowly descend in the dashpot chamber 76, and the spring 82 will expand and maintain the contact bar in engagement with the contacts 40 and 42. As soon however, as slots 84 establish communication between the chamber 76 and the atmosphere, the core 46 will drop suddenly and will positively disengage the contacts.

As soon as the fault has been cleared, and the transmission circuit is to be reestablished, it will be understood that the present invention provides a novel method and arrangement for energizing the various load sections at successive time intervals. Thus, as the protective device 14 is closed, service only to the load section 22 is immediately reestablished. It will be readily understood that due to the outage, the initial current demanded by the section 22 may be several times the load current, but this is much less than the total which is demanded by all of sections 22, 24, 26 and 28. After a time interval however, the high starting currents decrease and finally the load current assumes a normal value and the advantages of the diversity factor of the load are realized.

Simultaneously with the energization of the load section 22, the transformer 54 of the switch 16 is energized in order to activate the relay 60 of the switch 16. Due to the dashpot 74 which is associated with the core 63 of this relay, a time delay interval will occur before the contact member 64 bridges the contacts 68 and 70 to energize the solenoid winding 48 to cause terminal 32 to be connected with the terminal 42 through the contact bar 44. Such time delay interval is preferably such that the load current in the preceding load section 22 has decreased to substantially normal value before the member 64 connects contacts 68 and 70.

From the construction provided, it will be clear that as soon as the terminals 32 and 34 of the switch 16 are connected, the load section 24 and the transformer 54 of the sectionalizing switch 18 will be energized. Here again the latter will close to energize the load section 26, only after a time delay interval has occurred sufficient to enable the load current demanded by the section 24 to decrease to a substantially normal value. In like manner, the energization of the load section 28 will be delayed, through the operation of the switch 20. It will be understood that any desired number of sectionalizing switches may be employed, depending of course upon the character and arrangement of the load sections of the system.

While it is believed that the construction, operation and advantages of the invention are readily apparent from the foregoing, it is desired to set out here, a specific example of the manner in which the invention materially improves the operation of existing systems of distribution. Referring to Fig. 2 and assuming that the normal load current for the entire system is 400 amperes or 100 amperes per load section, it has been found in actual practice that the initial starting current after a sustained outage may be as high as 400 amperes per load section or approximately 1600 amperes for the system. Such initial load current decreases to the normal value in approximately 15 minutes, depending of course upon the character of the load. In the event that the sectionalizing switches of the present invention are employed and are arranged to energize each succeeding load section approximately 15 minutes after energization of the preceding load section it will be readily seen that the maximum current flow occurs when the section 28 is energized. Such maximum current will be 300 amperes plus 400 amperes or 700 amperes which value will decrease to 400 amperes in approximately 15 minutes. Should the entire system be energized at once, the initial load current would be 1600 amperes, more than twice that encountered when the system is used with the switches of this invention. With the use of the present invention, protective relays associated with the various load devices are entirely adequate because of the relatively low value of the starting current after an outage. Where the entire system is energized at once however, such relays would be entirely inadequate if the relays are selected to protect the system during normal operation.

The present invention thus affords a highly efficient arrangement for sectionalizing a transmission line in such a manner as to apply sections of the load at successive time intervals when reestablishing service following an outage.

While one form of the invention has been illustrated and described herein with considerable particularity, it will be readily understood by those skilled in the art that modifications may be resorted to without departing from the spirit of the invention. Reference will therefore be had to the appended claims for a definition of the limits of the invention.

We claim as our invention:

1. An automatic switch having a line terminal and a load terminal for connection to adjacent load sections of a distribution circuit having a protective device to successively automatically open and reclose the circuit a predetermined number of times and to thereafter remain open upon the persistence of an overload condition; said switch including means for opening the latter only a predetermined time interval after disappearance of voltage and current on said terminals which interval of time is greater than that between any of the aforesaid successive circuit opening and reclosing operations of said protective device, whereby said switch will open only after final opening of the circuit by said protective device, and means for closing said switch a predetermined time interval after appearance of voltage on said line terminal so as to be adapted to connect the load section remote from the protective device to the circuit a predetermined time interval after closing of said protective device and after removal of the overload condition.

2. An automatic switch having a pair of terminals adapted to be connected to adjacent load sections of an electrical distribution circuit to connect said sections in series circuit relation, said switch including separable contacts and a solenoid for separating and engaging the contacts, control circuit means for controlling said solenoid, means associated with said circuit means and responsive to appearance of voltage on one of said terminals a short time after disappearance of voltage from said terminals to instantaneously energize said solenoid and close the contacts, and other means associated with said circuit means and responsive to appearance of voltage on said one of said terminals a longer time after disappearance of voltage on said one terminal for delaying the action of the solenoid in closing said contacts.

3. A sectionalizing switch comprising a movably mounted control member having a contact engageable with a fixed contact, a solenoid having a core movable in opposite directions as the solenoid is energized and deenergized, means including a lost motion connection between the core and control member to positively move the latter to separate the contacts upon the taking up of said lost motion connection as the core moves in one direction, resilient means associated with the core and control member to urge the latter in a direction to maintain engagement between the contacts during the taking up of said lost motion connection as the core moves in the opposite direction, and a dashpot for retarding the movement of the core as the latter moves in said one direction to take up said lost motion connection, and time delay means responsive to voltage on the circuit to energize said solenoid means a predetermined time after the appearance of voltage on said circuit.

4. A sectionalizing switch comprising separable contacts, a solenoid having a core movable in opposite directions to separate and engage said contacts, a circuit for controlling the energization and deenergization of said solenoid and including a relay having a member movable to open and close the circuit, means for energizing and deenergizing said relay, means for delaying the closing of the circuit for a definite time interval after the energization of said relay, and means including a second circuit for energizing said solenoid upon energization of said relay.

5. A sectionalizing switch device comprising separable contacts, current responsive means having a movable member to separate and engage said contacts, means associated with said member to delay the separation of said contacts for a predetermined time interval following the interruption of current flow to said current responsive means, and means for controlling the application of current to said current responsive means comprising a control circuit, means for energizing and deenergizing said control circuit, a time delay switch for establishing a current flow to said current responsive means a predetermined time interval after energization of said control circuit, and a second control circuit connected in parallel with said time delay switch for establishing a current flow to said current responsive means immediately upon energization of the first named control circuit and arranged to be closed in response to flow of current in the first control circuit and to open a predetermined time interval after deenergization of said first control circuit.

6. A sectionalizing switch device comprising separable contacts, a solenoid having a movable core for controlling the separation and engagement of the contacts, circuit means for controlling said solenoid including a first circuit having a switch therein and a second circuit connected in parallel with said switch and including a thermal responsive switch, a relay associated with said first circuit and including a member movable to close said switch, means to energize the relay and said second circuit, means cooperating with said member to provide a time delay interval in the closing of said switch, and electrical heating means in the first circuit arranged in thermal relation with said thermal responsive switch to close the latter to complete said second circuit, said thermal responsive switch being constructed and arranged to remain closed for a predetermined time interval after deenergization of said relay.

7. An automatic switch having a line terminal and a load terminal for connection to adjacent load sections of a distribution circuit having a protective device to successively open and reclose the circuit a predetermined number of times and to thereafter remain open upon the persistance of an overload condition, said switch including separable contacts which are biased apart, electroresponsive means for closing said contacts and maintaining them closed when energized, time delay means preventing separation of said contacts for a time greater than the open circuit time between successive operations of said protective device in a cycle of operation, voltage responsive time delay means for energizing said contact closing means a predetermined time after appearance of voltage on said line to close said contacts, means responsive to zero voltage on said line terminal to open a circuit a predetermined time after the occurrence of zero voltage, and means responsive to energization of said contact closing means by said voltage responsive means to close another energizing circuit through said zero voltage responsive means, so that the contacts of said switch will not open during a cycle of operation of said protective device but will open only after the last operation of any such cycle of operation.

8. An automatic switch having a line terminal and a load terminal for connection to adjacent load sections of a circuit having a protective device to successively open and reclose the circuit a predetermined number of times and to thereafter remain open upon the persistence of an overload condition; said switch including separable contacts which are biased apart, electro-responsive means for closing said contacts and maintaining them closed when energized, time delay means preventing separation of said contacts for a time greater than the open circuit time between successive operations of said protective device in a cycle of operation, means responsive to zero voltage on said line terminal to open an energizing circuit for said electro-responsive means a predetermined time after the occurrence of zero voltage, and other means responsive to voltage on said line terminal for establishing an energizing circuit through said zero voltage responsive means, so that the contacts of said switch will not open during a cycle of operation of said protective device but will open only after the last operation of any such cycle of operation.

9. An automatic switch comprising, separable contacts which are biased apart, electro-responsive means adapted when energized to close said contacts and hold them closed, time delay means responsive to voltage on the circuit to energize said electro-responsive means a predetermined time after the appearance of voltage on said circuit, second time delay means preventing separation of said contacts for a predetermined time following disappearance of voltage from the circuit, and means responsive to energization of said electro-responsive means for conditioning a second voltage responsive means to energize said electro-responsive means instantaneously upon the occurrence of voltage on the circuit, and said second voltage responsive means including means for delaying resetting thereof to a non-voltage responsive condition, so that said electro-responsive means is instantaneously energized following an open circuit condition of short duration, but its energization is delayed following an open circuit condition which is of longer duration than the resetting period of said second voltage responsive means.

10. A switch comprising, separable contacts which are biased apart, solenoid means for closing said contacts and holding them closed when said solenoid means is energized, said solenoid means having lost motion with respect to said contacts, resilient means reacting between said solenoid means and contacts to be stressed when said solenoid means is energized and said contacts closed, time delay means governing movement of said solenoid means at least in the contact opening direction so that said contacts will remain closed a predetermined time following deenergization of said solenoid means, and time delay means responsive to voltage on the circuit to energize said solenoid means a predetermined time atfer the appearance of voltage on said circuit.

11. A switch comprising, separable contacts which are biased apart, solenoid means for closing said contacts and holding them closed when said solenoid means is energized, said solenoid means having lost motion with respect to said contacts, resilient means reacting between said solenoid means and contacts to be stressed when said solenoid means is energized and said contacts closed, time delay means governing movement of said solenoid means at least in the contact opening direction so that said contacts will remain closed a predetermined time following deenergization of said solenoid means, time delay means responsive to voltage on the circuit to energize said solenoid means a predetermined time after the appearance of voltage on said circuit, and means responsive to energization of said electro-responsive means for conditioning a second voltage responsive means to energize said solenoid means instantaneously upon the occurrence of voltage on the circuit, and said second voltage responsive means including means for delaying resetting thereof to a non-voltage responsive condition, so that said electro-responsive means is instantaneously energized following an open circuit condition of short duration, but its energization is delayed following an open circuit condition which is of longer duration than the resetting period of said second voltage responsive means.

12. An automatic switch having a pair of terminals adapted to be connected to adjacent load sections of an electrical distribution circuit to connect said sections in series circuit relation, said switch including separable contacts which are biased open and electro-responsive means for closing the contacts, control means responding to the presence of voltage on one line terminal for energizing said electro-responsive means comprising one means responsive to a relatively short absence of voltage from said one terminal for instantaneously energizing said electro-responsive means and a time delay means responsive to the appearance of voltage on said one terminal for energizing said electro-responsive means only after the lapse of a predetermined time.

13. An automatic switch having a pair of terminals adapted to be connected to adjacent load sections of an electrical distribution circuit to connect said sections in series circuit relation, said switch including separable contacts which are biased open and electro-responsive means for closing the contacts, control means responding to the presence of voltage on one line terminal for energizing said electro-responsive means, said control means being biased to reset and open the energizing circuit for said electro-responsive means in the absence of voltage on said one terminal, and said control means including timing means dependent on the length of time voltage is absent from said one terminal for varying the time required by said control means to energize said electro-responsive means when voltage reappears on said one terminal.

14. An automatic switch having a line terminal and a load terminal for connection to adjacent load sections of a distribution circuit having a protective device to successively automatically open and reclose the circuit a predetermined number of times and to thereafter remain open upon the persistence of an overload condition; said switch being biased open, means responsive to line voltage on said terminals to prevent opening of said switch by its opening bias including time delay means permitting opening of the switch a predetermined time interval after disappearance of voltage and current on said terminals which interval of time is greater than that between any of the aforesaid successive circuit opening and reclosing operations of said protective device, whereby said switch will open only after final opening of the circuit by said protective device, and means for closing said switch a predetermined time interval after appearance of voltage on said line terminal so as to be adapted to connect the load section remote from the protective device to the circuit a predetermined time interval after closing of said protective device and after removal of the overload condition.

15. A switch comprising, separable contacts which are biased apart, solenoid means for closing said contacts and holding them closed when said solenoid means is energized, said solenoid means having lost motion with respect to said contacts, time delay means governing movement of said solenoid means at least in the contact opening direction while taking up said lost motion so that said contacts will remain closed a predetermined time following deenergization of said solenoid means, and time delay means responsive to voltage on the circuit to energize said solenoid means a predetermined time after the appearance of voltage on said circuit.

16. A switch comprising, separable contacts which are biased apart, solenoid means for closing said contacts and holding them closed when said solenoid means is energized, said solenoid means having lost motion with respect to said contacts, resilient means acting on said solenoid means to be stressed when said solenoid means is energized, time delay means governing movement of said solenoid means at least in the contact opening direction while taking up said lost motion so that said contacts will remain closed a predetermined time following deenergization of said solenoid means, and time delay means responsive to voltage on the circuit to energize said solenoid means a predetermined time after the appearance of voltage on said circuit.

17. A sectionalizing switch comprising separable contacts, a solenoid having a core movable in opposite directions to open and close said contacts, said core being movable relative to said contacts in a circuit opening direction a predetermined amount before causing opening of said contacts, means preventing movement of said core relative to said contacts in a circuit closing direction prior to engagement of said contacts, circuit means for energizing said solenoid when the circuit means is closed and for deenergizing said solenoid when the circuit means is opened to correspondingly cause movement of said core to close or open said contacts, means for delaying the movement of said core relative to said contacts in a direction to open the contacts when said circuit means is opened and said solenoid is deenergized, means movable to close said circuit means, and means associated with said movable means for delaying the movement of the latter to close the circuit means.

JAMES M. WALLACE.
ANDREW W. EDWARDS.

References Cited in the file of this patent

UNITED STATES PATENTS

| Number | Name | Date |
| --- | --- | --- |
| 1,272,444 | Holiday | July 16, 1918 |
| 1,272,447 | Jacobs | July 16, 1918 |
| 1,501,699 | Bliss | July 15, 1924 |
| 1,698,295 | Bliss | Jan. 8, 1929 |
| 1,743,748 | Anderson | Jan. 14, 1930 |
| 1,795,198 | Connell | Mar. 3, 1931 |
| 2,029,137 | Stevens | Jan. 28, 1936 |
| 2,068,620 | Spurgeon | Jan. 19, 1937 |
| 2,333,604 | Wallace | Nov. 2, 1943 |
| 2,443,338 | Berry | June 15, 1948 |
| 2,468,498 | Kyle | Apr. 26, 1949 |
| 2,475,765 | Wallace | July 12, 1949 |